US006886891B2

United States Patent
Hara et al.

(10) Patent No.: US 6,886,891 B2
(45) Date of Patent: May 3, 2005

(54) WHEEL-CAP MOUNTING STRUCTURE

(75) Inventors: Kouichi Hara, Gunma (JP); Yasufumi Sugauchi, Gunma (JP); Yuusuke Ikuma, Gunma (JP); Osamu Uchida, Gunma (JP); Yousuke Suzuki, Gunman (JP)

(73) Assignee: Moriroku Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/459,710

(22) Filed: Jun. 12, 2003

(65) Prior Publication Data

US 2004/0041459 A1 Mar. 4, 2004

(30) Foreign Application Priority Data

Jun. 19, 2002 (JP) ........................................ 2002-178388

(51) Int. Cl.⁷ .................................................. B60B 7/12
(52) U.S. Cl. ................................ 301/37.33; 301/37.32; 301/37.35
(58) Field of Search ......................... 301/37.102, 37.31, 301/37.32, 37.33, 37.35, 37.36

(56) References Cited

U.S. PATENT DOCUMENTS

| 4,457,559 | A | * | 7/1984 | Renz | 301/37.36 |
| 4,470,639 | A | * | 9/1984 | Bernd | 301/37.36 |
| 4,826,253 | A | * | 5/1989 | Shirai et al. | 301/37.36 |
| 4,917,441 | A | * | 4/1990 | Iida | 301/37.36 |
| 4,995,674 | A | * | 2/1991 | Shirai et al. | 301/37.36 |
| 5,161,860 | A | * | 11/1992 | Sakane | 301/37.42 |

FOREIGN PATENT DOCUMENTS

| JP | 62-279101 | * | 12/1987 |
| JP | 63-207703 | * | 8/1988 |
| JP | 63-89802 | | 10/1988 |
| JP | 2-45201 | * | 2/1990 |
| JP | 3-65402 | * | 3/1991 |
| JP | 2635335 | | 4/1997 |

* cited by examiner

Primary Examiner—Russell D. Stormer
(74) Attorney, Agent, or Firm—Arent Fox PLLC

(57) ABSTRACT

In a structure of mounting a wheel cap to a wheel, a plurality of pairs of support plates are projectingly provided on an inner wall of the wheel cap made of a synthetic resin and arranged annularly so that the support plates in each pair are opposed to each other in a circumferential direction. A pair of elastic support legs extending from opposed surfaces of the support plates in each pair are integrally connected to each other to form a V-shape. A locking claw is formed on a connection between the support legs and capable of being engaged into a locking recess in an inner peripheral surface of a rim of the wheel. An annular setting spring is connected to the locking claws for biasing the locking claws in a direction to come into engagement in the locking recess. Thus, it is possible to form each of the support legs supporting each of the locking claws sufficiently long to enhance the flexibility of the support leg, thereby improving durability of the support legs and mounting property of the wheel cap.

3 Claims, 5 Drawing Sheets

WHEEL-CAP MOUNTING STRUCTURE

BACKGROUND OF THE INVENTION

1. Field of the Invention

The present invention relates to an improvement in a wheel-cap mounting structure in which a wheel cap is mounted to a wheel of an automobile to cover an outer side face of the wheel.

2. Description of the Related Art

There is a wheel-cap mounting structure conventionally known as disclosed in, for example, Japanese Patent Publication No. 2635335 in which a plurality of pairs of support plates are projectingly provided on an inner wall of a wheel cap and arranged annularly so that each pair of the support plates are opposed to each other in a circumferential direction; a support leg having an elasticity is provided to rise vertically at a central portion of a bridging rod integrally connecting the support plates in each set to each other; a locking claw is formed at a tip end of the support leg and capable of being engaged into a locking recess in an inner peripheral surface of a rim of the wheel; and an annular setting spring is connected to the locking claws for biasing the locking claws in a direction to come into engagement in the locking recess.

In such a wheel-cap mounting structure, it is desired that the support leg having the locking claw formed thereon has a lower spring constant and a sufficient flexibility in order to enhance the durability of the support leg and improving the mounting property of the wheel cap to the wheel. However, the distance from the outer surface of the wheel to the locking recess is very short and hence, in the conventional structure, it is impossible to form the support leg sufficiently long particularly due to the presence of the bridging rod. Therefore, the spring constant of the support leg is increased, resulting in a poor flexibility and thus, it is difficult to say that the durability of the support leg and the mounting property of the wheel cap are good.

SUMMARY OF THE INVENTION

Accordingly, it is an object of the present invention to provide a wheel-cap mounting structure, wherein the support leg can be formed sufficiently long to enhance the flexibility of the support leg, thereby improving durability of the support leg and mounting property of the wheel cap.

To achieve the above object, according to a first feature of the present invention, there is provided a wheel-cap mounting structure comprising: a plurality of pairs of support plates which are projectingly provided on an inner wall of a wheel cap and arranged annularly so that the support plates in each pair are opposed to each other in a circumferential direction; a pair of elastic support legs extending from opposed surfaces of the support plates in each pair, said support legs being integrally connected to each other to form a V-shape; a locking claw formed on a connection between the support legs and capable of being engaged into a locking recess in an inner peripheral surface of a rim of a wheel; and an annular setting spring connected to the locking claws for biasing the locking claws in a direction to come into engagement in said locking recess.

With the first feature, each of the support legs is inclined with respect to the support plate, and its effect length can be set at a large value as compared with the conventional support leg provided to rise vertically at the central portion of the bridging rod. Therefore, the bending spring constant of each of the support legs in the radial direction of the wheel cap, can be reduced to enhance the flexibility of the support legs in such a direction, thereby improving the durability of the support legs and the mounting property of the wheel cap. Moreover, the support legs arranged in the V-shape with the tip ends integrally connected to each other can exhibit a high rigidity in the circumferential direction of the wheel cap. Therefore, it is possible to reliably prevent the falling of the support legs in the circumferential direction of the wheel cap to contribute to the stabilization of the mounting attitude of the wheel cap.

According to a second feature of the present invention, in addition to the first feature, a notched groove is provided in a top of the locking claw contacting with a bottom surface of the locking recess.

With the second feature, the contact pressure between the locking claw and the bottom surface of the locking recess can be increased by the notched groove to facilitate the elimination of soil and sand existing in the contact area between the locking claw and the bottom surface, and the eliminated soil and sand can be received by the notched groove, thereby prevent the natural disengagement of the locking claw from the locking recess.

According to a third feature of the present invention, in addition to the first or second feature, an angular U-shaped restricting notch is formed in a tip end of each of the support plates and adapted to receive the annular setting spring to restrict a diametrical movement of the setting spring within a given range.

With the third feature, it is possible to restrict the excessive eccentric movement of the setting spring and the excessive flexure of each of the locking claws, to improve the mounting property of the wheel cap to the wheel.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
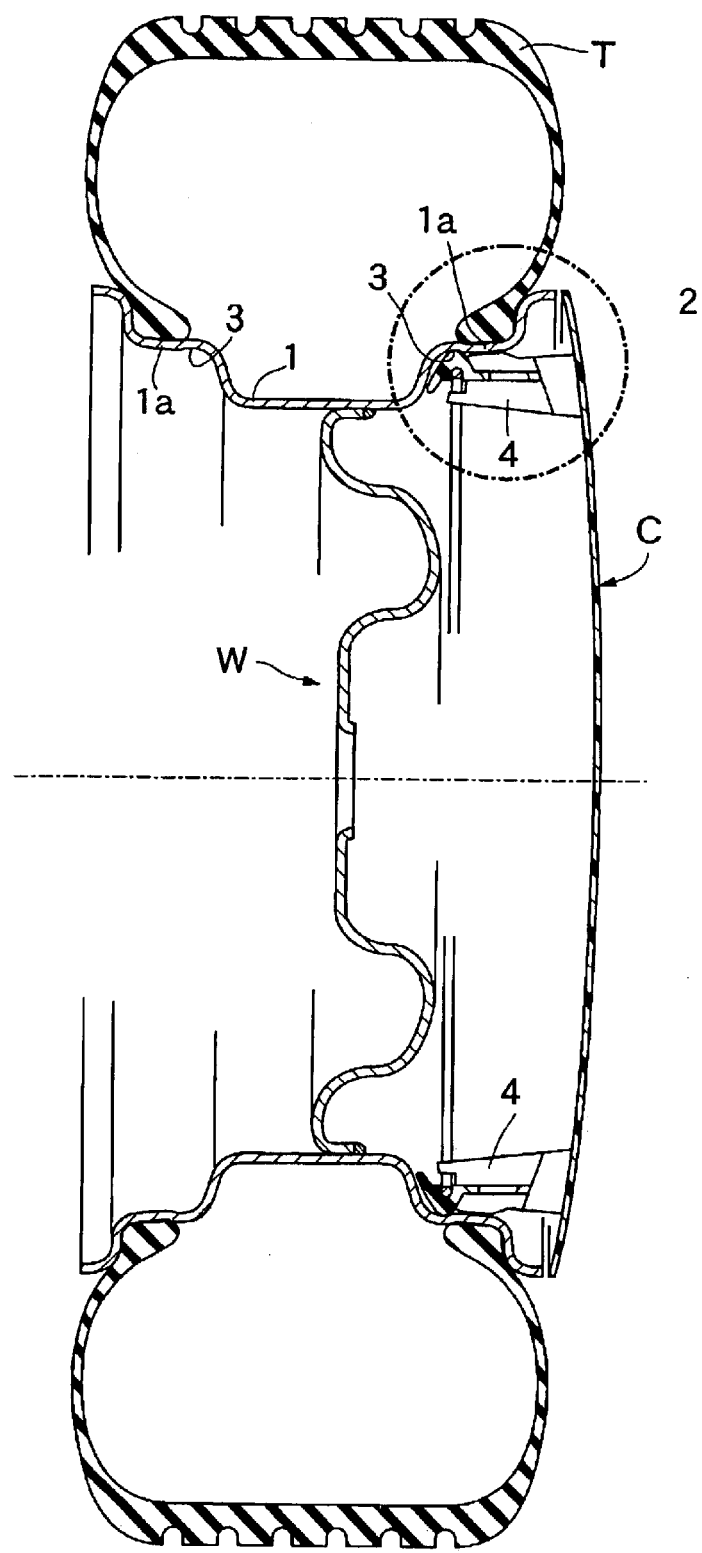
FIG. 1 is a vertical sectional view of a wheel for an automobile, which is provided with a wheel-cap mounting structure according to the present invention.
Figure 2:
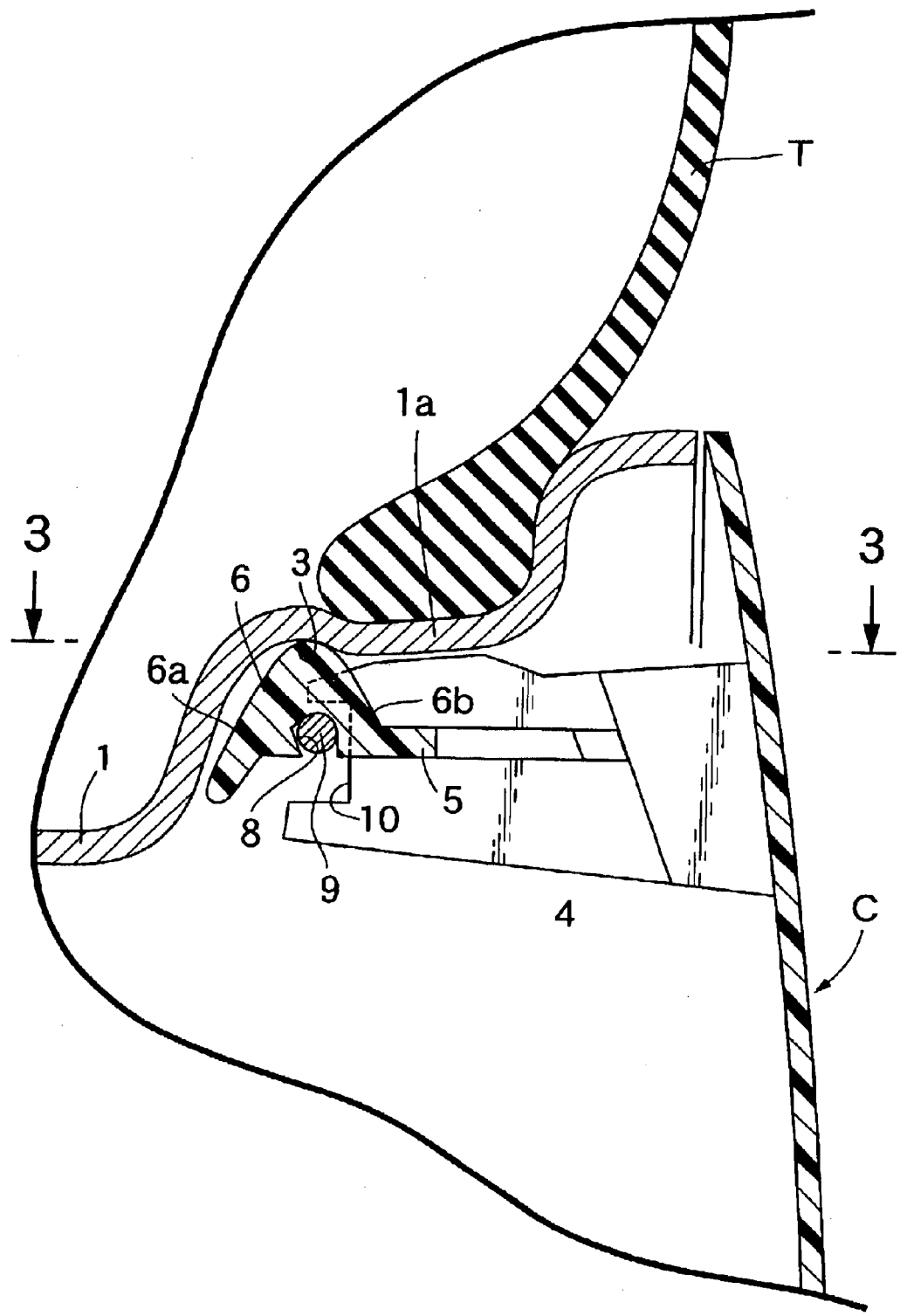
FIG. 2 is an enlarged view of a portion indicated by 2 in FIG. 1.
Figure 3:
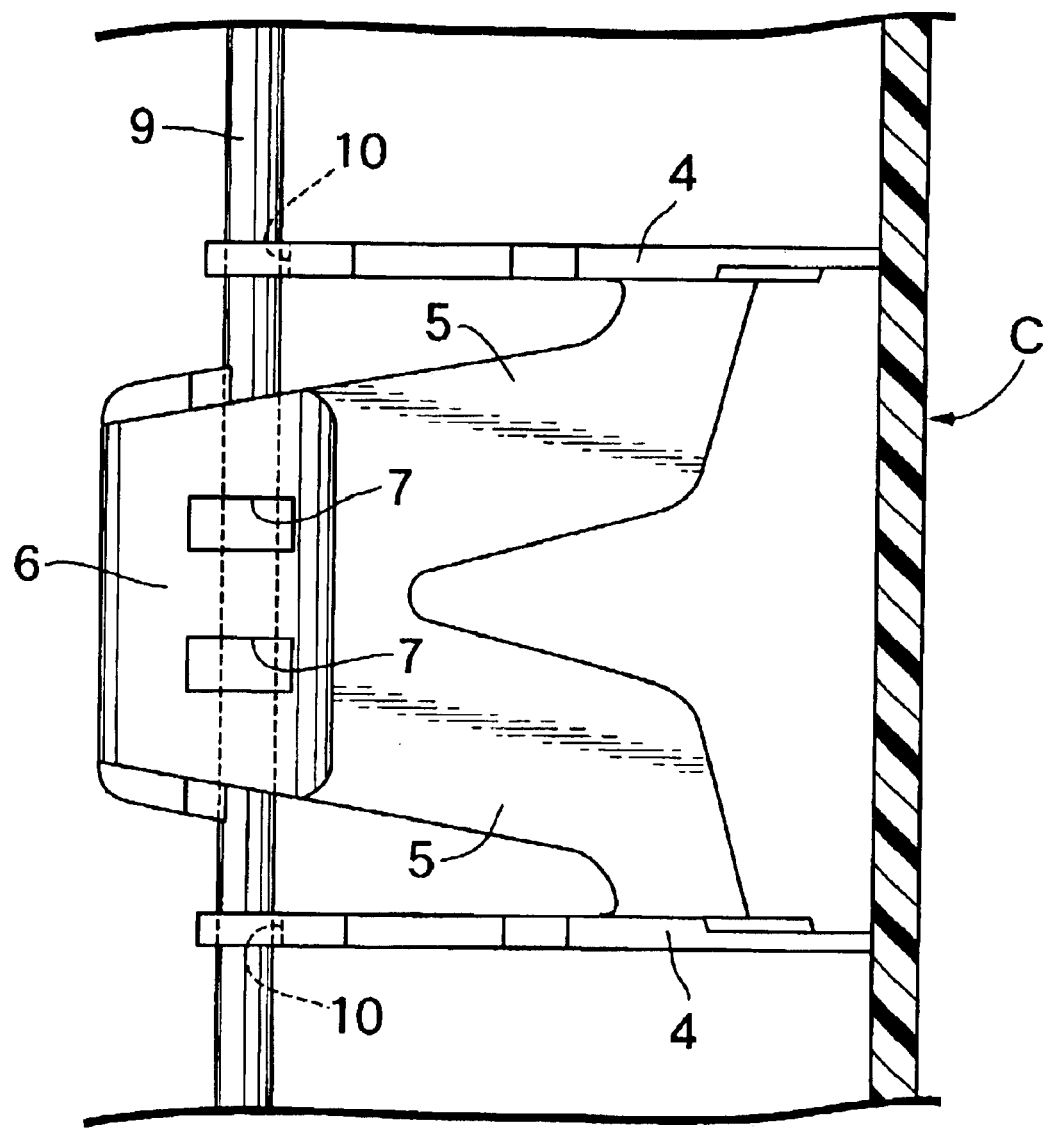
FIG. 3 is a sectional view taken along a line 3—3 in FIG. 2.
Figure 4:
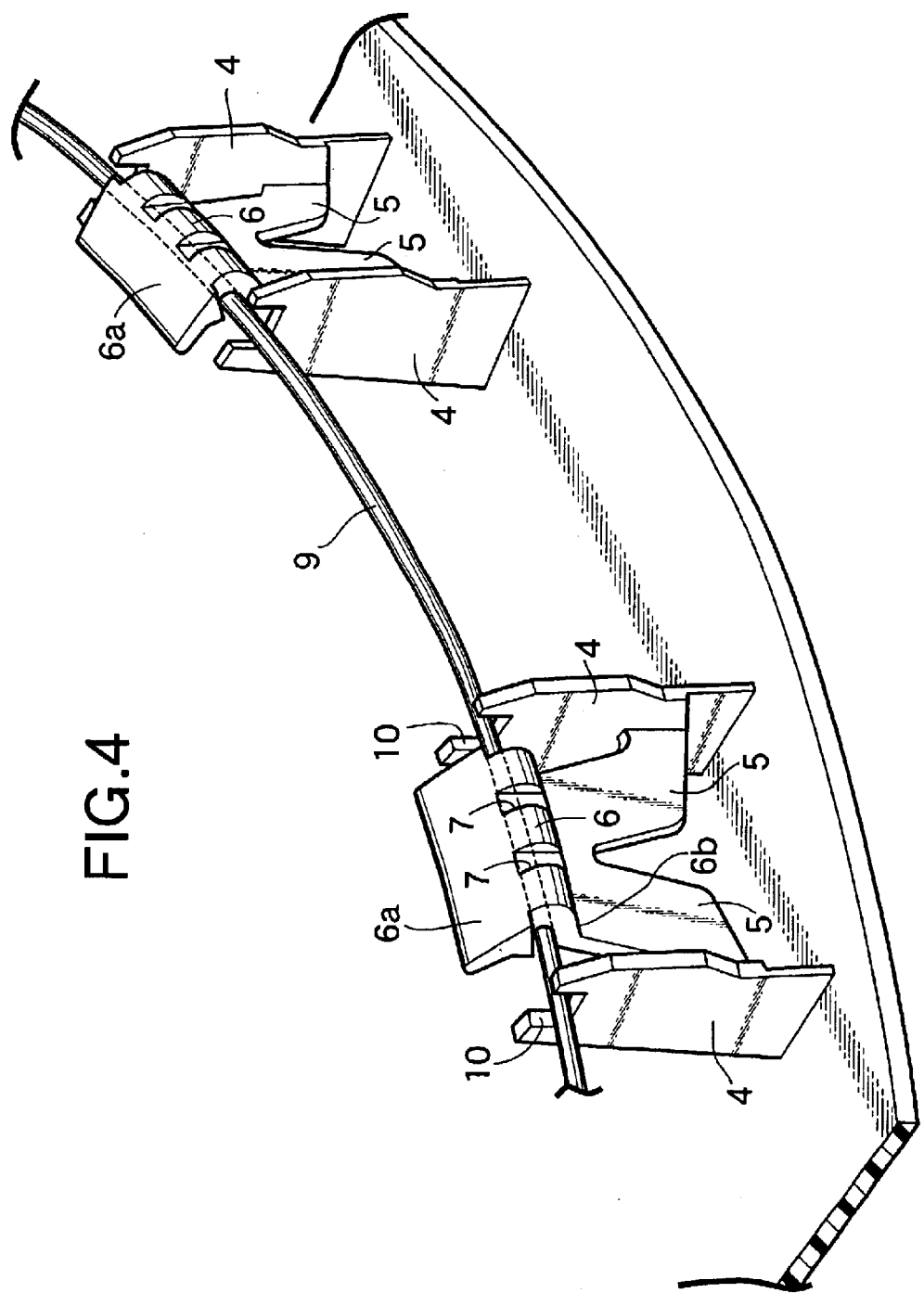
FIG. 4 is a perspective view taken from the radial outside of the wheel-cap mounting structure.
Figure 5:
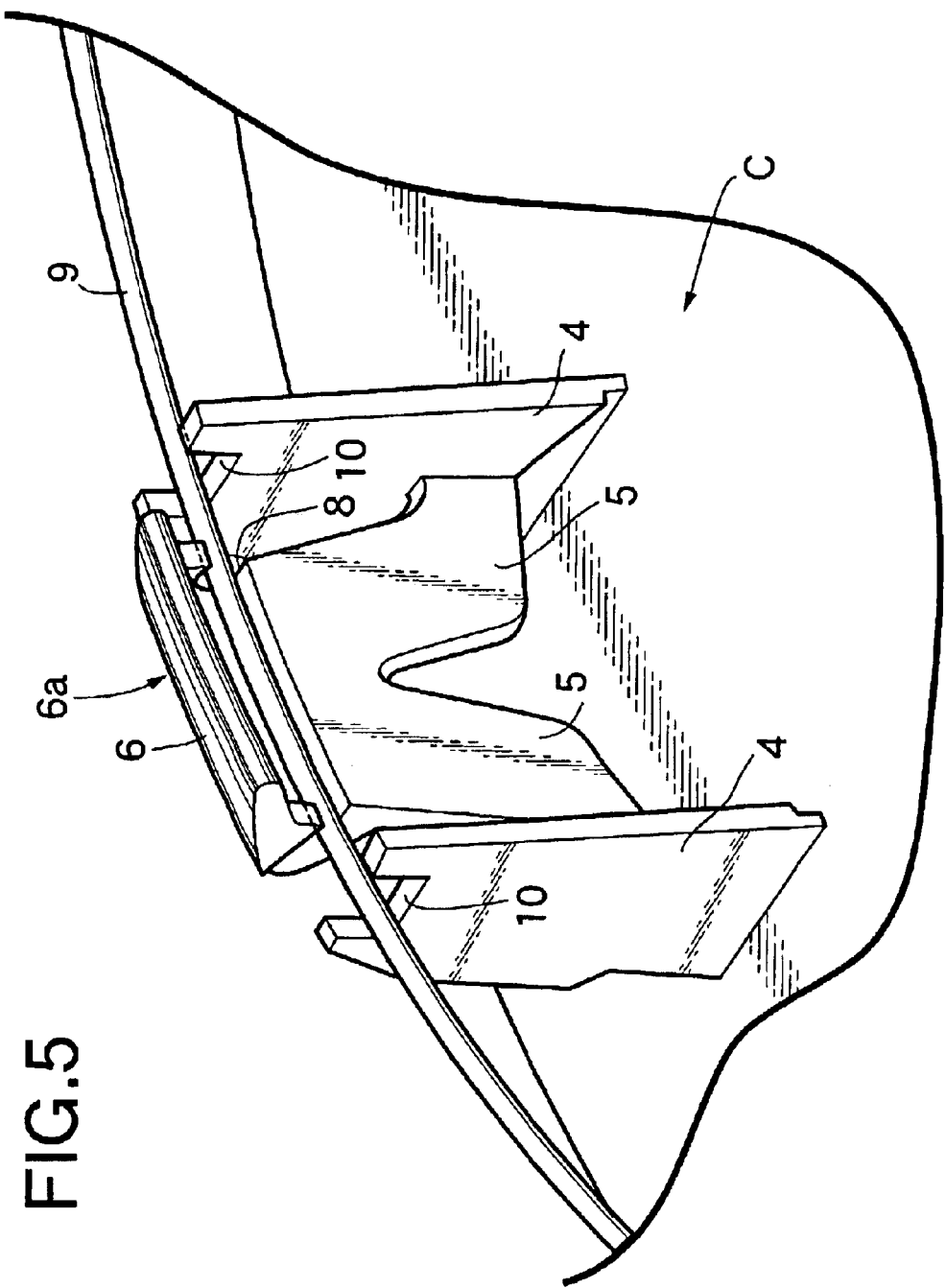
FIG. 5 is a perspective view taken from the radial inside of the wheel-cap mounting structure.

Referring first to FIGS. 1 and 2, a wheel W for an automobile comprises a rim 1 on an outer periphery of which a tire T is mounted, and a spoke 2 coupled to an axially central portion of an inner periphery of the rim 1. The rim 1 is provided at its laterally opposite ends with cylindrical flanged portions 1a with which left and right bead portions of the tire T are brought into close contact, and an annular locking recess 3 is formed in an inner peripheral surface of each of the cylindrical portions 1a. A wheel cap C is mounted to a wheel-cap mounting structure according to the present invention by utilizing the annular locking recesses 3 to cover an outer side face of the wheel W.

The mounting structure will be described below with reference to FIGS. 2 to 5.

The wheel cap C is made of a synthetic resin, and a plurality of pairs of support plates 4, 4 are projectingly provided on an inner wall of the wheel cap and arranged annularly at equal distances so that the support plates in each pair are opposed to each other in a circumferential direction. In this case, all the pairs of support plates 4, 4 are fitted to the inner peripheral surface of the cylindrical portion 1a of the rim 1 by cooperation with each other, and arranged so that the concentricity of the wheel cap C relative to the wheel W can be ensured.

A pair of support legs 5, 5 are integrally formed on each pair of the support plates 4, 4 to extend from base portions of their opposed surfaces. Each of the support legs 5, 5 is in the form of a plate thin in a radial direction of the wheel cap C, and tip ends of the support legs 5, 5 forming a V-shape by cooperation with each other are integrally connected to each other. In this way, the support legs 5, 5 formed of a synthetic resin into the plate shape and integrally connected at their tip ends to each other has a bending elasticity in the radial direction of the wheel cap C, but exhibits a strong rigidity in the other directions.

Further, a locking claw 6 is integrally formed at a connection between the tip ends of the support legs 5, 5, so that it can be engaged into the locking recess 3 in the rim 1. The locking claw 6 is ridged radially outwards from the wheel W and formed into a chevron-shape having a ridgeline extending in a circumferential direction of the wheel cap C. Therefore, the locking claw 6 has a pair of slopes 6a and 6b (see FIG. 2) inclined in opposite directions from each other in an axial direction of the cylindrical portion 1a. Further, a plurality of notched grooves 7 (see FIG. 4) are formed in a top of a chevron face of the locking claw 6 in a direction crossing the ridgeline.

A retaining groove 8 is formed in a back face of the locking claw 6 opposite from the chevron face, to extend in the circumferential direction of the wheel cap C. An annular setting spring 9 common to all the locking claws 6 is mounted in the retaining groove 8, so that all the locking claws 6 are biased radially outwards by a radially outward tension of the setting spring 9. As a result, the setting spring 9 is supported in a floated manner and concentrically with the wheel cap C by all the support legs 5, 5.

Thus, all the locking claws 6 are arranged so that an inscribed circle contacting with the tops of the chevron portions of the locking claws 6 is slightly larger than the inner diameter of the annular locking recess 3 in a state in which the locking claws 6 are biased radially outwards by the tension of the setting spring 9.

On the other hand, angular U-shaped restricting notches 10, 10 for receiving the setting spring 9 are formed at tip ends of the support plates 4, 4 in each pair, respectively. Opposed inner sidewalls of the restricting notches 10, 10 are usually not in contact with the setting spring 9, but when the setting spring 9 is eccentrically moved from the center of the wheel cap C due to the deformation of one or more pairs of support legs 5, 5, the inner sidewall of one of the restricting notches 10, 10 receives the setting spring 9. Thus, it is possible to restrict the excessive eccentric movement of the setting spring 9 and the excessive flexure of each of the locking claws 6, to improve the mounting property of the wheel cap C to the wheel W.

The operation of the embodiment will be described below.

To mount the wheel cap C to the wheel W, the wheel cap C is pushed toward an outer side face of the wheel W. This causes all the locking claws 6 to move radially inwards, while the slope 6a closer to the inside of the cylindrical portion 1a is slid on the inner peripheral surface of the cylindrical portion 1a of the rim 1, whereby the support legs 5, 5 are flexed radially inwards against the tension of the setting spring 9. When the locking claw 6 reaches a position in the locking recess 3 of the cylindrical portion 1a of the rim 1, the locking claw 6 is engaged into the locking recess 3 under the action of a resilient force of the setting spring 9, and the wheel cap C is retained on the rim 1 by an engagement force in a state to cover the outer side face of the wheel W. In this case, all the pairs of support plates 4, 4 are fitted to the inner peripheral surface of the cylindrical portion 1a of the rim 1 by cooperation with one another, thereby ensuring the concentricity of the wheel cap C relative to the wheel W. Therefore, it is possible to provide an appropriate mounting attitude to the wheel cap C.

To remove the wheel cap C from the wheel W, a tool such as a screwdriver is insert between an outer peripheral edge of the wheel cap C and the rim 1 to pull back the wheel cap C outwardly sideways against the engagement force, whereby each of the locking claws 6 is disengaged from the locking recess 3, while the slope 6b closer the outside of the cylindrical portion 1a is slid on the peripheral edge of the locking recess 3 opposed to the slope 3b. Therefore, each of the locking claws 6 can be then slid smoothly on the inner peripheral surface of the cylindrical portion 1a, whereby the wheel cap C can be removed.

Each pair of the support legs 5, 5 supporting the locking claw 6 extend from the base portions of the opposed surfaces of the pair of support plates 4, 4, and their tip ends are integrally connected to each other to form the V-shape. Therefore, each of the support legs 5, 5 is inclined with respect to each of the support plates 4, 4, and its effective length can be set at a large value, as compared with the conventional support leg provided to rise vertically at the central portion of the bridging rod. Further, the effective length can be freely set by appropriately selecting the width of the support legs 5, 5 and the angle of the V-shape. Therefore, the bending spring constant of each of the support legs 5, 5 in the radial direction of the wheel cap C can be reduced to enhance the flexibility of the support legs 5, 5, thereby improving the durability of the support legs 5, 5 and the mounting property of the wheel cap C.

Moreover, the support legs 5, 5 arranged in the V-shape with the tip ends integrally connected to each other exhibit a high rigidity in a direction of arrangement of the support legs, that is, in the circumferential direction of the wheel cap C. Therefore, it is possible to reliably prevent the falling of the support legs 5, 5 in the circumferential direction of the wheel cap C, to contribute to the stabilization of the mounting attitude of the wheel cap C.

The plurality of notched grooves 7 formed in the top of the chevron face of each of the locking claws 6 function to increase the contact pressure between the locking claw 6 and a bottom surface of the locking recess 3 in the rim 1 thereby facilitating the elimination of soil and sand existing in the contact area between the locking claw 6 and the bottom surface, and to receive the eliminated soil and sand. Thus, it is possible to prevent the natural disengagement of the locking claws 6 from the locking recess 3.

It will be understood that the present invention is not limited to the above-described embodiments, and various modifications in design may be made without departing from the spirit and scope of the invention defined in claims. For example, each of the plate-shaped support legs 5 may be replaced by a bar-shaped support leg.

What is claimed is:

1. A wheel-cap mounting structure comprising: a plurality of pairs of support plates which are projectingly provided on an inner wall of a wheel cap and arranged annularly so that the support plates in each pair are opposed to each other in a circumferential direction; a pair of elastic support legs extending from opposed surfaces of the support plates in each pair, said support legs being integrally connected to each other to form a V-shape; a locking claw formed on a connection between the support legs and capable of being engaged into a locking recess in an inner peripheral surface of a rim of a wheel; and an annular setting spring connected to the locking claws for biasing the locking claws in a direction to come into engagement in said locking recess.

2. A wheel-cap mounting structure according to claim 1, wherein a notched groove is provided in a top of said locking claw contacting with a bottom surface of said locking recess.

3. A wheel-cap mounting structure according to claim 1 or 2, wherein an angular U-shaped restricting notch is formed in a tip end of each of said support plates and adapted to receive said annular setting spring to restrict a diametrical movement of said setting spring within a given range.

* * * * *